(12) United States Patent
Li et al.

(10) Patent No.: US 8,914,802 B2
(45) Date of Patent: Dec. 16, 2014

(54) FEEDBACK-DRIVEN TUNING FOR EFFICIENT PARALLEL EXECUTION

(75) Inventors: Wen-Syan Li, Fremont, CA (US); Xuefeng Jia, Shnaghai (CN)

(73) Assignee: SAP SE, Walldorf (DE)

(*) Notice: Subject to any disclaimer, the term of this patent is extended or adjusted under 35 U.S.C. 154(b) by 303 days.

(21) Appl. No.: 13/587,531

(22) Filed: Aug. 16, 2012

(65) Prior Publication Data
US 2014/0019984 A1   Jan. 16, 2014

(30) Foreign Application Priority Data

Jul. 11, 2012  (CN) .......................... 2012 1 0240600

(51) Int. Cl.
*G06F 9/46* (2006.01)
(52) U.S. Cl.
USPC ......................................................... 718/102
(58) Field of Classification Search
CPC .................................................... G06F 9/5061
USPC ......................................................... 718/102
See application file for complete search history.

(56) References Cited

U.S. PATENT DOCUMENTS

| | | | | |
|---|---|---|---|---|
| 2003/0120780 A1* | 6/2003 | Zhu et al. | ....................... | 709/226 |
| 2006/0005198 A1* | 1/2006 | Uchishiba et al. | ............ | 718/104 |
| 2011/0191783 A1* | 8/2011 | Le Moal | ....................... | 718/105 |
| 2012/0117008 A1* | 5/2012 | Xu et al. | ......................... | 706/12 |
| 2012/0233322 A1* | 9/2012 | Baumback et al. | ........... | 709/224 |
| 2013/0212277 A1* | 8/2013 | Bodik et al. | .................. | 709/226 |

OTHER PUBLICATIONS

Jansson et al, Concurrency and Parallel Methods for multi-core Platforms, 2010, Department of Computer Science and Engineering Chalmers University of Technology.*
Saman et al, Top-down Heuristic for Finding Optimal GrainSize of Parallel Tasks, 1995, Penerbit Universiti Pertanian Malaysia.*
Yan et al, Calibrating Resource Allocation for Parallel Processing of Analytic Tasks, 2009 IEEE International Conference on e-Business Engineering.*
Karypis, George, "CDP Tutorial 3 Basics of Parallel Algorithm Design," University of Minnesota, Mar. 24, 2006, 16 pages.
Hovemeyer, David, "Lecture 18: Fork/Join Parallelism," Lecture Notes, York College of Pennsylvania, Jul. 5, 2011, 5 pages.

* cited by examiner

*Primary Examiner* — Emerson Puente
*Assistant Examiner* — Charlie Sun
(74) *Attorney, Agent, or Firm* — Brake Hughes Bellermann LLP

(57) ABSTRACT

A parallel execution manager may determine a parallel execution platform configured to execute tasks in parallel using a plurality of available processing threads. The parallel execution manager may include a thread count manager configured to select, from the plurality of available processing threads and for a fixed task size, a selected thread count, and a task size manager configured to select, from a plurality of available task sizes and using the selected thread count, a selected task size. The parallel execution manager may further include an optimizer configured to execute an iterative loop in which the selected task size is used as an updated fixed task size to obtain an updated selected thread count, and the updated selected thread count is used to obtain an updated selected task size. Accordingly, a current thread count and current task size for executing the tasks in parallel may be determined.

20 Claims, 8 Drawing Sheets

FEEDBACK-DRIVEN TUNING FOR EFFICIENT PARALLEL EXECUTION

CROSS-REFERENCE TO RELATED APPLICATION

This application claims priority under 35 U.S.C. §119 to Chinese Patent Application No. 201210240600.6, filed on Jul. 11, 2012, titled "FEEDBACK-DRIVEN TUNING FOR EFFICIENT PARALLEL EXECUTION", which is incorporated herein by reference in its entirety.

TECHNICAL FIELD

This description relates to parallel processing.

BACKGROUND

The size of large databases and other software applications may be a limiting factor in the usefulness of such applications, particularly when queries, calculations, operations, and other tasks are themselves long and complex. For example, a user may wish to issue a complex query to obtain results from a relational database having many thousands or millions of records, in which case a response time to provide corresponding query results may be unacceptably long. Moreover, such scenarios may lend themselves to inefficient use of available computational resources, e.g., by allowing over-consumption of resources by one user with respect to other current users.

Availability of multi-core (e.g., multi-CPU) computing systems have facilitated the development of parallel execution techniques as a way to mitigate such concerns. For example, by using two available cores, multiple tasks (and/or multiple portions thereof) may be computed in parallel with one another. Consequently, for example, two equivalent tasks may be executed in less than double the time it would take to execute one of the tasks.

Implementation of such parallel tasks, however, is difficult to accomplish in an efficient or optimal manner. For example, there may be costs associated with splitting/assigning multiple tasks to the multiple cores, as well as costs associated with re-joining or merging the results of the tasks. Depending, e.g., on the nature of the tasks in question and the extent of the parallelization, such costs may limit, and may ultimately dominate or overwhelm, the benefits of the parallelization.

Moreover, complexity and unpredictability of a runtime environment of one or more running tasks may exacerbate the difficulties of multi-core parallel task processing. For example, even if an acceptable plan for parallelization is formulated prior to runtime of a task(s) in question, it may occur that runtime events may reduce the efficacy or desirability of the planned schedule (for example, when processing cores have substantially greater or lesser runtime availability than anticipated).

Additionally, these and other types of computational overheads may vary according to the types of tasks being computed. For example, some tasks may be easier to divide and/or combine than other tasks. Moreover, tasks being computed may change over time, e.g., as current tasks are completed, and new tasks are loaded. Therefore, and depending on how the various tasks are configured for parallel computation thereof, the varying tasks may again suffer from associated computational overheads to varying extents.

Thus, when creating tasks and/or configuring created tasks for a parallel computation thereof, it may be difficult to predict and/or account for an impact of various types of associated computational overhead. Consequently, a full benefit of parallel computing may be difficult to achieve.

SUMMARY

According to one general aspect, a system may include instructions recorded on a computer-readable medium, and executable by at least one processor. The system may include a parallel execution manager configured to cause the at least one processor to determine a parallel execution platform configured to execute tasks in parallel using a plurality of available processing threads. The parallel execution manager may include a thread count manager configured to select, from the plurality of available processing threads and for a fixed task size, a selected thread count, and a task size manager configured to select, from a plurality of available task sizes and using the selected thread count, a selected task size. The parallel execution manager may further include an optimizer configured to execute an iterative loop in which the selected task size is used as an updated fixed task size to obtain an updated selected thread count, and the updated selected thread count is used to obtain an updated selected task size, and further configured to complete the iterative loop and provide a current thread count and current task size for use by the parallel execution platform in executing the tasks in parallel.

Implementations may include one or more of the following features. For example, the parallel execution manager may include a response time monitor configured to monitor an execution time of the tasks by the parallel execution platform. The thread count manager may be configured to receive a benchmark processing time for the task from the response time monitor while using an existing thread count, and may be further configured to iteratively test subsequent thread counts against the benchmark processing time, including replacing the existing thread count with a subsequent thread count whenever the subsequent thread count is associated with a parallel processing time that is superior to the benchmark processing time, until the selected thread count is obtained. The thread count manager may be further configured to perform quadratic probing of a solution space of the subsequent thread counts to select therefrom for the iterative testing against the benchmark processing time.

The task size manager may be configured to receive a benchmark processing time for the task from the response time monitor while using an existing task size, and may be further configured to iteratively test subsequent task sizes against the benchmark processing time, including replacing the existing task size with a subsequent task size whenever the subsequent task size is associated with a parallel processing time that is superior to the benchmark processing time, until the selected task size is obtained. The task size manager may be configured to perform probing of a solution space of the subsequent task sizes, wherein the solution space includes tasks sizes which may be assigned to each processing thread equally.

The parallel execution manager may include a verifier configured to verify, after a period of time following the providing thereof, a continuing optimal status of the current thread count and the current task size. The verifier may be further configured to determine a benchmark processing time with respect to a benchmark task, using the current thread count and/or the current task size, vary the current thread count and/or the current task size and obtain an updated benchmark processing time therewith, and indicate that the current thread count and/or current task size are no longer optimal, based on a comparison of the benchmark processing time with the updated benchmark processing time. Additionally, or alternatively, the verifier may be configured to dynamically adjust the period of time in between each of a plurality of verifications of the current thread count and/or task size.

A computer-implemented method for executing instructions stored on a computer readable storage medium may include determining a parallel execution platform configured to execute tasks in parallel using a plurality of available processing threads. The method may include selecting, from the plurality of available processing threads and for a fixed task size, a selected thread count, and selecting, from a plurality of available task sizes and using the selected thread count, a selected task size. The method may include executing an iterative loop in which the selected task size is used as an updated fixed task size to obtain an updated selected thread count, and the updated selected thread count is used to obtain an updated selected task size, and completing the iterative loop and provide a current thread count and current task size for use by the parallel execution platform in executing the tasks in parallel.

Implementations may include one or more of the following features. For example, the method may include monitoring an execution time of the tasks by the parallel execution platform, and selecting the selected thread count and the selected task size based on the monitored execution time.

The selecting, from the plurality of available processing threads and for a fixed task size, a selected thread count, may include receiving a benchmark processing time for the tasks while using an existing thread count, and iteratively testing subsequent thread counts against the benchmark processing time, including replacing the existing thread count with a subsequent thread count whenever the subsequent thread count is associated with a parallel processing time that is superior to the benchmark processing time, until the selected thread count is obtained.

The selecting, from a plurality of available task sizes and using the selected thread count, a selected task size, may include receiving a benchmark processing time for the tasks using an existing task size, and iteratively testing subsequent task sizes against the benchmark processing time, including replacing the existing task size with a subsequent task size whenever the subsequent task size is associated with a parallel processing time that is superior to the benchmark processing time, until the selected task size is obtained.

The method may include verifying, after a period of time following the providing thereof, a continuing optimal status of the current thread count and the current task size. The verifying may include determining a benchmark processing time with respect to a benchmark task, using the current thread count and/or the current task size, varying the current thread count and/or the current task size and obtain an updated benchmark processing time therewith, and indicating that the current thread count and/or current task size are no longer optimal, based on a comparison of the benchmark processing time with the updated benchmark processing time.

According to another general aspect, a computer program product that is tangibly embodied on a computer-readable storage medium may include instructions that, when executed, are configured to determine a parallel execution platform configured to execute tasks in parallel using a plurality of available processing threads. The instructions, when executed, may be further configured to select, from the plurality of available processing threads and for a fixed task size, a selected thread count, and select, from a plurality of available task sizes and using the selected thread count, a selected task size. The instructions, when executed, may be further configured to execute an iterative loop in which the selected task size is used as an updated fixed task size to obtain an updated selected thread count, and the updated selected thread count is used to obtain an updated selected task size, and complete the iterative loop and provide a current thread count and current task size for use by the parallel execution platform in executing the tasks in parallel.

Implementations may include one or more of the following features. For example, the instructions, when executed, may be further configured to monitor an execution time of the tasks by the parallel execution platform, and select the selected thread count and the selected task size based on the monitored execution time. The selected thread count may include receiving a benchmark processing time for the tasks while using an existing thread count, and iteratively testing subsequent thread counts against the benchmark processing time, including replacing the existing thread count with a subsequent thread count whenever the subsequent thread count is associated with a parallel processing time that is superior to the benchmark processing time, until the selected thread count is obtained. Additionally, or alternatively, the selection of the selected task size may include receiving a benchmark processing time for the tasks while using an existing task size, and iteratively testing subsequent task sizes against the benchmark processing time, including replacing the existing task size with a subsequent task size whenever the subsequent task size is associated with a parallel processing time that is superior to the benchmark processing time, until the selected task size is obtained.

The instructions, when executed, may be further configured to verify, after a period of time following the providing thereof, a continuing optimal status of the current thread count and the current task size. The verifying may include determining a benchmark processing time with respect to a benchmark task, using the current thread count and/or the current task size, varying the current thread count and/or the current task size and obtain an updated benchmark processing time therewith, and indicating that the current thread count and/or current task size are no longer optimal, based on a comparison of the benchmark processing time with the updated benchmark processing time.

The details of one or more implementations are set forth in the accompanying drawings and the description below. Other features will be apparent from the description and drawings, and from the claims.

DETAILED DESCRIPTION

Figure 1:
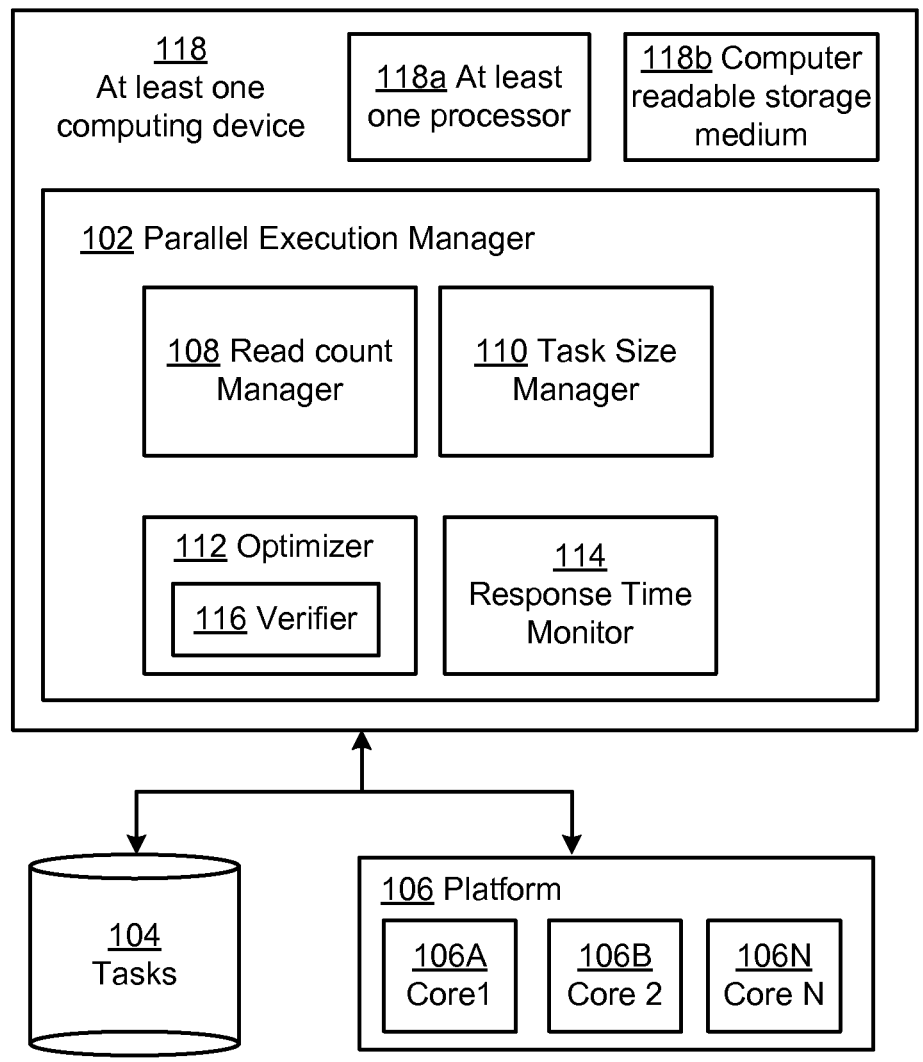
FIG. 1 is a block diagram of a system for feedback-driven tuning for efficient parallel execution.

FIG. 1 is a block diagram of a system 100 for feedback-driven tuning for parallel execution. In the example of FIG. 1, a parallel execution manager 102 may be configured to execute tasks 104 in a parallelized manner, by utilizing a platform 106. As shown and described, the platform 106 is capable of executing multiple, parallel threads of execution, as represented in FIG. 1 through the illustration of processing cores 106A, 106B, . . . , 106N. More specifically, as described in detail below, the parallel execution manager 102 may be configured to actively manage a manner and extent to which parallelization of the tasks 104 using the platform 106 is implemented over time. In particular, the parallel execution manager 102 may be configured to achieve optimizations in parallelization in a manner which is generally agnostic to a type or nature of the platform 106, and which does not require significant knowledge of a manner and extent to which the platform 106 and associated parallelization parameters react to the types of computational overhead referenced herein, and described in detail below.

In the specific example of FIG. 1, the tasks 104 may be understood to represent virtually any task of a software application, or any task that may be implemented or facilitated through the use of appropriate computer hardware/software. For example, such tasks may include, by way of non-limiting example, computations, data storage/management/retrieval, tasks related to a providing of a graphical user interface and associated functionalities, and virtually any other task that can be divided for parallel execution using the platform 106. In various ones of the following examples, e.g., in the examples of FIGS. 3A-4B, the tasks are described as tasks of a sales forecasting application. Nonetheless, it may be appreciated from the above description that such examples are merely for the sake of illustration, and are not considered to be limiting in any way.

Meanwhile, the platform 106 may be understood to represent virtually any multi-threaded parallel execution platform that may be utilized to implement parallelization of the task 104. For example, the platform 106 may represent a single processor having multiple threads of execution, and/or a plurality of processors or processing cores that are each designed to implement one or more execution threads. In the various examples described herein, as referenced above and illustrated in the example of FIG. 1, the platform 106 may be described as including a plurality of processing cores, but, again, such examples may be understood to be included merely for the sake of illustration, without being limiting in any way.

By way of specific example, the processing cores 106A, 106B, . . . 106N may be understood to refer to, or include, any multi-computing platform in which a plurality of processors, central processing units (CPUs), or other processing resources are available, including network/device clusters. For example, parallel query processing is known as an option for improving database performance on existing SMP/CMP (Symmetrical Multi-Processing/Chip-level Multi-Processing) servers, particularly for high performance database systems which are able to process huge volumes of data and complex queries efficiently. Thus, in the present description, it should be appreciated that the term core represents a unit(s) of processing power within any such environment in which multiple processing options are available.

Thus, as described, the system 100 may utilize the platform 106 to execute parallel processing of the tasks 104. In this regard, the system 100 may be understood to implement various otherwise-conventional functions which may be associated with such parallel processing. For example, the parallel execution manager 102, and/or associated hardware/software, may be configured to divide the tasks 104, or subsets or subtasks thereof, into individual execution threads for independent, parallel processing thereof using the cores 106A . . . 106N of the platform 106. Similarly, the parallel execution manager 102 may be configured to aggregate or combine results of such parallel computations, to thereby obtain an overall result (or set of results) for the original tasks.

As referenced above, these and other aspects of performing parallel processing may incur computational overhead of varying types or extents. For example, as illustrated and described below with respect to FIG. 3A, increases in a number of threads utilized to process the tasks 104 are generally associated with increases in computational overhead associated with the splitting/combining operations just described. As shown and described in detail with respect to FIG. 3A, increasing a number of processing threads (e.g., utilizing more of the available cores 106A . . . 106N) corresponds with overall reductions in processing time, until a point is reached at which the increased computational overhead outweighs the benefits of utilizing additional threads/cores.

Another type of computational overhead experienced by the system 100 relates to relative sizes of the tasks 104. For example, in conventional systems, it may occur that individual tasks of the task 104 assigned to corresponding, individual cores of the cores 106A . . . 106N may vary in size with respect to one another. For example, a task assigned to the core 106A may include twice as many blocks of data (e.g., bytes of data) as a task assigned to the core 106B, and/or may take twice as long to calculate. In such scenarios, all else being equal, the processing core 106B will complete its task more quickly than will the processing core 106A. Consequently, the processing core 106B may be forced to sit idle until completion of the processing of the core 106A with respect to its assigned task, assuming that the parallel processing of both tasks can only complete when the individual results are both available to be aggregated or otherwise combined.

Thus, as described, various types of computational overhead may have effects of varying extents on an overall efficiency of parallel processing. Moreover, the extent of such effects may vary in relation to the type of platform 106 being utilized, or may vary based on the types of computational overhead that are present in a given scenario (e.g., may vary based on an interrelationship of the types of computational overhead that are present). Thus, even if difficulties in predicting the type and extent of computational overhead in a given parallel computing scenario could be overcome, it may be infeasible or impossible in existing systems to update and utilize such predictions in a manner that is fast enough to account for changes that may occur over time during particular parallel processing scenarios.

Thus, the parallel execution manager 102 includes a thread count manager 108 which may be configured to select an optimal thread count of processing threads to be utilized in parallel processing of the tasks 104. More specifically, the thread count manager 108 may be configured to select the optimal thread count during a time in which a data size of the tasks 104 currently being computed is held fixed and constant.

Meanwhile, a task size manager 110 may be configured to select an optimal data size for the tasks 104. More specifically, the task size manager 110 may be configured to select the optimal data size during a time in which an associated thread count is held fixed and constant.

Further, an optimizer 112 may be configured to conduct operations of the thread count manager 108 and the task size manager 110 in an interleaving, iterative manner, to thereby obtain an overall, optimized parallel processing configuration. For example, upon selection of an optimal thread count by the thread count manager 108, the optimizer 112 may be configured to provide the selected, optimal thread count to the task size manager 110, for use as the relevant fixed thread count to be utilized during selection of an optimal task size by the task size manager 110. Conversely, but similarly, upon a resulting selection of an optimal task size by the task size manager 110, the optimizer 112 may be configured to provide the resulting task size to the thread count manager 108, for use as the relevant fixed task size to be used by the thread count manager 108 during a selection of an updated optimized thread count. In this way, the optimizer 112 may oversee iterative, interleaving operations of the managers 108, 110, to thereby ultimately determine final results for an optimal thread count and a corresponding optimal task size used as a basis to define a resulting, overall parallel processing configuration.

During the operations described above, and during related operations as described herein, the managers 108, 110 and the optimizer 112 may utilize response time measurements provided by a response time monitor 114. That is, the response time manager 114 may generally be configured to measure or otherwise quantify or characterize a length of time required by the platform 106 to complete computations during a time in which a certain set of parameters of a parallel processing configuration are applicable.

For example, as referenced above, the optimizer 112 may be configured to assign a fixed task size to the thread count manager 108, whereupon the thread count manager 108 may proceed to iteratively or progressively test different thread counts for potential selection thereof at the optimal thread count. Specific example techniques for such operations of the thread count manager 108 are described in more detail below, but in general, it may be appreciated that the thread count manager 108 may proceed to implement various different thread counts for executing the tasks 104 with the fixed task size. For each thread count that is attempted/considered, the response time monitor 114 may be utilized to provide corresponding processing times to the thread count manager 108. In this way, the thread count manager 108 may be configured to compare the relative processing time of each attempted/potential thread count, to thereby select the optimal thread count as the thread count which provides the smallest processing time.

In a similar way, the task size manager 110 may be configured to utilize the response time monitor 114 to select an optimal task size when performing parallel processing using a fixed thread count. In other words, for example, for a given, fixed thread count, the task size manager 110 may search through a solution space of available, potential task sizes in order to determine the selected, optimal task size. In so doing, the task size manager 110 may compare processing times achieved with respect to various task sizes within the solution space, so as to thereby attempt to select the task size which provides a minimum or otherwise optimal processing time. Thus, as referenced above with respect to the thread count manager 108, the response time monitor 114 may be configured to measure or otherwise characterize parallel processing times of relevant portions of the platform 106, so as to thereby provide the task size manager 110 with an ability to meaningfully compare different task sizes, and thereby select the optimal task size.

In example implementations, as described in more detail below with respect to FIGS. 7-8, the managers 108, 110 may be configured to identify a search space of potential thread counts and task sizes, respectively, and then to execute, e.g., a binary or quadratic search to explore the relevant search space and identify an optimal thread count and task size, respectively, In executing such searches, for example, the managers 108, 110 may iteratively select a potential thread count/task size, obtain performance measurements associated with executing parallel processing of sample tasks using the potential thread count/task size parameters (based on execution of the sample tasks by the platform 106 as measured by the response time monitor 114). In this way, if the resulting processing time represents an improvement over the current benchmark processing time, then the associated thread count/task size processing parameters may be adopted as the new, current benchmark value for processing time in a subsequent iteration. Otherwise, the thread count/task size parameters associated with the current benchmark value for processing time may be carried forward to the subsequent iteration.

Thus, in practice, the optimizer 112 may be configured to utilize the above-described functionalities of the managers 108, 110 and the response time monitor 114 to determine an optimal parallel processing configuration, in a dynamic, fast, flexible manner. In particular, the optimizer 112 may be configured to cause the managers 108, 110 to execute an iterative loop in which a selected thread count provided by the thread count manager 108 when utilizing the fixed task size becomes the fixed thread count used by the task size manager 110 when selecting an optimal task size. In turn, then, the thus-selected optimal task size may be utilized as the updated, fixed task size during the following operations of the thread count manager 108 in selecting a new, updated optimal thread count. As described in detail below, this iterative loop may continue until the optimizer 112 determines that little or no incremental improvement is yielded by subsequent iterations, or until a preconfigured number of iterations or passage of time has occurred.

Consequently, the parallel execution manager 102 may be configured to identify, select, and utilize an optimal parallel processing configuration, including selected values for the optimal thread count and optimal task size, as just described. Moreover, the parallel execution manager 102 may do so with little or no prior knowledge regarding a nature of the platform 106. Instead, the parallel execution manager 102 may determine the optimal parallel processing configuration during a runtime of the platform 106, in a manner that relies on feedback obtained during actual operations of the platform 106. For example, optimal parallel processing parameters may be determined using the above-described techniques during an initial operation of the system 100, utilizing sample tasks selected for testing purposes for selecting the optimal parallel processing parameters.

Thus, during an initial operation and/or parameterization of the platform 106 to execute the tasks 104, the parallel execution manager 102 may operate in the manner just described, in order to determine parallel processing parameters to be utilized, including the optimal thread count and associated optimal task size. In this way, parallel processing of the task 104 may proceed.

Over time, however, changes may occur which may result in the selected parallel processing parameters becoming suboptimal. For example, previously-unavailable processing cores of the platform 106 may become available (or vice-versa), or new processing cores may be added to the platform 106. At the same time, the tasks 104 may change or otherwise be updated over time.

Consequently, the optimizer 112 is illustrated as including an optimization verifier 116, which is configured to verify whether previously-selected parallel processing parameters have become suboptimal over time. For example, after the platform 106 has been executing the task 104 in parallel for a designated period of time using the selected, optimal parallel processing parameters, the optimization verifier 116 may be configured to change some or all of the parallel processing parameters from their current values, so as to determine whether the thus-changed parallel processing parameters result in an improvement to the overall parallel processing speeds.

If such changes do not result in improvements to the parallel processing speed, then the parallel execution manager 102 may continue operating the platform 106 using the already-selected parallel processing parameters. If, however, the altered parallel processing parameters demonstrate an improvement in the parallel processing speeds, then the optimization verifier 116 may trigger the optimizer 112 to select new, updated parallel processing parameters. In other words, as described, the optimizer 112 may again utilize the managers 108, 110 and the response time monitor 114 to select an optimal thread count and associated optimal task size.

Thus, in summary, the thread count manager 108 is generally configured to input or otherwise determine a fixed task size, a plurality of available thread counts, and feedback from the response time monitor 114 with respect to one or more benchmark tasks executed using the platform 106, and output a selected, optimal thread count. Meanwhile, similarly, the task size manager 110 is configured to input a thread count and a plurality of available or potential task sizes, along with feedback from the response time monitor 114 with respect to execution of the benchmark tasks using the platform 106. Then, as described, the optimizer 112 may utilize an output of one of the managers 108, 110 as input to the other of the managers 108, 110, thereby executing an iterative loop, until the iterative loop is completed and current values of the thread count and task size are thereafter provided to the platform 106 for subsequent use in parallel processing of the task 104. Then, from time to time, the verifier 116 may be utilized to test whether the current values can or should be improved upon, and, if so, may cause the optimizer 112 to repeat the above-described iterative loop to obtain new values for the thread count and task size.

FIG. 1 provides example structures and associated components which may be utilized to provide the various features and functions described herein. For example, FIG. 1 includes, in addition to the various components already described, at least one computing device 118, including at least one processor 118a, and computer readable storage medium 118b. In the example, the computer readable storage medium 118b may be utilized to store instructions which, when executed by the at least one processor 118a of the at least one computing device 118, may be configured to provide the parallel execution manager 102 and related features and functions.

In addition, the computer readable storage medium 118b may represent virtually any appropriate computer memory which may be utilized during operations of the parallel execution manager 102. For example, appropriate memory may be used to store the tasks 104, or to store data produced during intermediate stages of operations of the parallel execution manager 102.

Although FIG. 1 nominally illustrates a single computing device executing the parallel execution manager 102, it may be appreciated from FIG. 1 and from the above description that, in fact, a plurality of computing devices, e.g., a distributed computing system, may be utilized to implement the parallel execution manager 102. For example, portions of the parallel execution manager 102 may be executed in a first part of such a distributed computing system, while other portions may be executed elsewhere within the distributed system.

More generally, it may be appreciated that any single illustrated component in FIG. 1 may be implemented using two or more subcomponents to provide the same or similar functionality. Conversely, any two or more components illustrated in FIG. 1 may be combined to provide a single component which provides the same or similar functionality. In particular, as referenced above, the task 104, although illustrated separately from the at least one computing device 102, may in fact be stored using the at least one computing device 102.

Similarly, the at least one computing device 118 is illustrated separately from the platform 106, and may be included, e.g., as distinct components of a distributed system. However, in example implementations, it may be appreciated that these two components may be combined, so that the parallel execution manager 102 operates in the context of the platform 106 itself.

Thus, FIG. 1 is illustrated and described with respect to example features and terminologies, which should be understood to be provided merely for the sake of example, and not as being at all limiting of various potential implementations of FIG. 1 which are not explicitly described herein. For example, in the present description, thread counts output by the thread count manager 108, as well as task sizes output by the task size manager 110, may be referred to as an optimal thread count and/or an optimal task size. In this regard, it may be appreciated that the term optimal need not refer to values that literally optimize a processing time of the platform 106. For example, the term optimal may refer to a thread count or task size which is the best available in light of existing constraints. For example, a number of iterative loops performed by the optimizer 112 may be limited, e.g., by time, so that the optimal thread count/task size represents an optimal value that may be obtained using the available amount of time.

Figure 2:
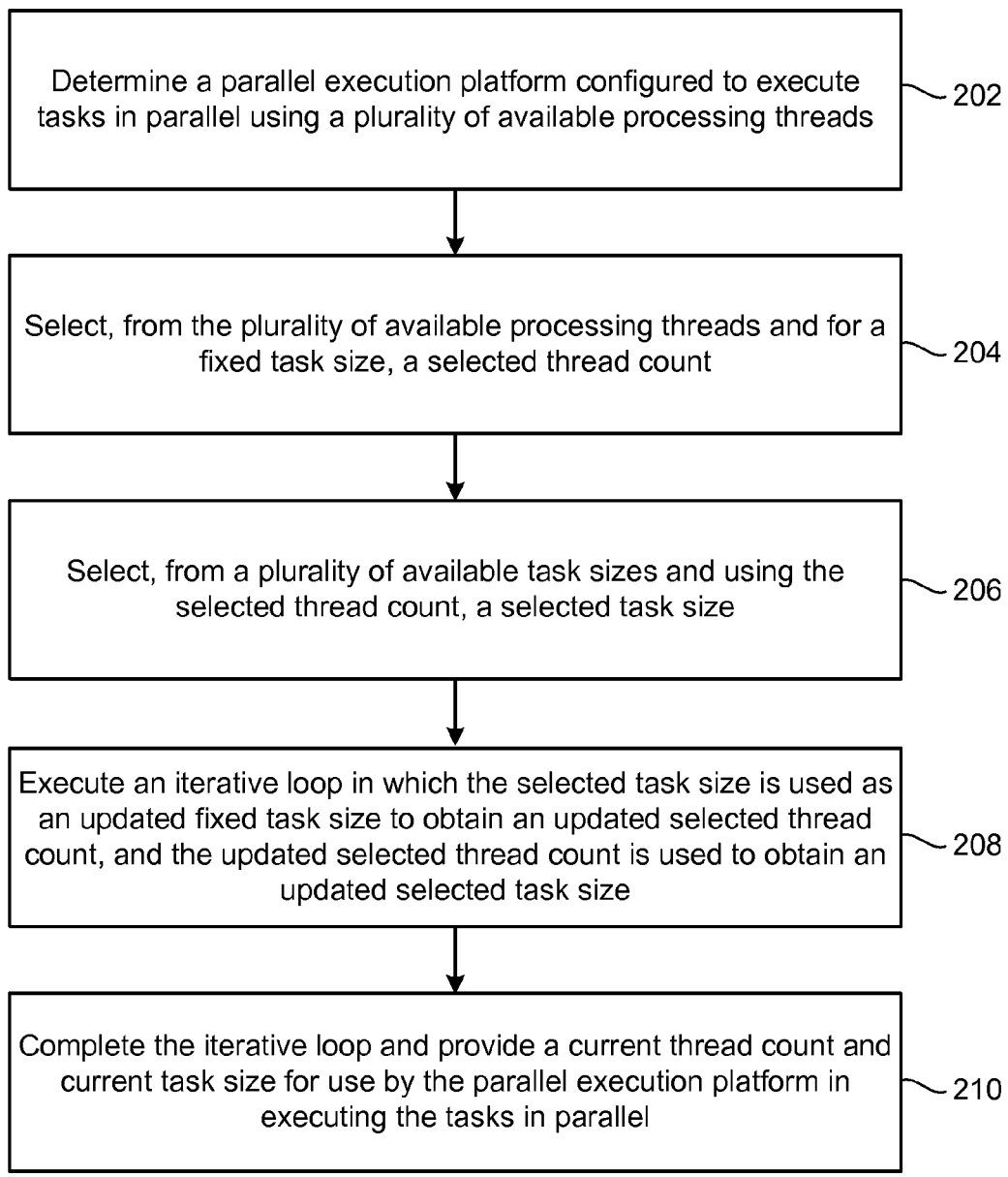
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations, and including an iterative loop as described herein. However, it may be appreciated that the various operations 202-210 may be executed differently than as shown and described. For example, variations of the operations 202-210 may be performed in a nested fashion, and/or may include additional or alternative operations (not specifically illustrated). Similarly, operations may be performed in a different order than that shown, and one or more of the operations may be omitted.

In the example of FIG. 2, a parallel execution platform configured to execute tasks in parallel using a plurality of available processing threads, may be determined (202). For example, the parallel execution manager 102 may be configured to identify platform 106 and available processing cores 106A . . . 106N, or subsets thereof, for use in performing parallel processing of the task 104.

From the plurality of available processing threads and for a fixed task size, a thread count may be selected (204). For example, the thread count manager 108 may utilize a fixed task size (e.g., a previously-selected task size received from the task size manager 110 after completion of an earlier iteration of an iterative loop), and, in conjunction with feedback from the response time manager 114, may select a selected thread count from a plurality of potential thread counts, represented in the example by the processing cores 106A . . . 106N. In practice, for example, as described, the thread count manager 108 may execute benchmark tasks using the fixed task size and various ones of the available processing threads and associated thread counts (where the various thread counts to be considered may be obtained in the context of a binary search or quadratic search of the available/potential thread counts). Then, parallel execution of the benchmark tasks may be measured or otherwise quantified using the response time manager 114, to thereby provide feedback to the thread count manager 108 for use in comparing processing results obtained by the various, considered thread counts, and thereby selecting the thread count associated with the lowest processing time as the selected thread count.

From a plurality of available task sizes and using the selected thread count, a task size may be selected (206). For example, the task size manager 110 may perform similar operations as just described with respect to the thread count manager 108, but using the just-selected thread count as a fixed thread count to be considered in conjunction with varying ones of available task sizes, again in conjunction with measurements of processing of the benchmark tasks by the platform 106, as determined by the response time manager 114.

An iterative loop may be executed, in which the selected task size is used as an updated fixed task size to obtain an updated selected thread count, and the updated selected thread count is used to obtain an updated selected task size (208). For example, the optimizer 112 may be configured to execute the iterative loop using the managers 108, 110, such that thread counts provided by the thread count manager 108 are utilized by the task size manager 110 to determine a new task size, which, in turn, is used by the thread count manager 108 to obtain an updated thread count.

The iterative loop may be completed and a current thread count and current task size may be provided for use by the parallel execution platform in executing the task in parallel (210). For example, the optimizer 112 may output a current thread count/task size which exists after a specified number of iterations and/or after passage of a designated amount of time, for use by the platform 106 in executing the tasks 104.

Figure 3A:
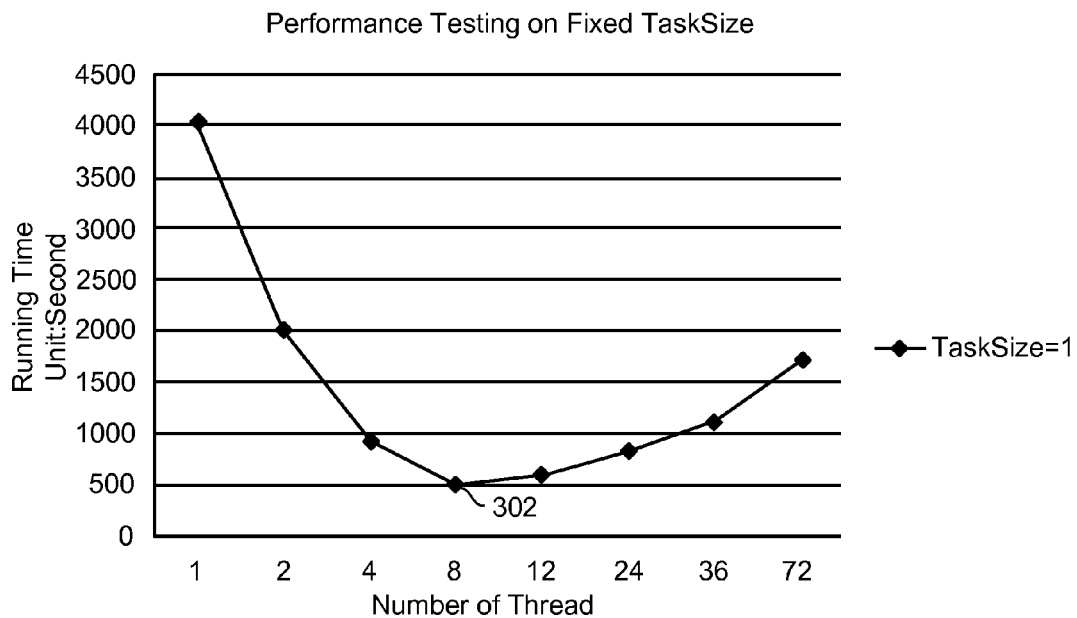
FIG. 3A is a graph illustrating changes in parallel processing speeds as a function of thread counts.
Figure 3B:
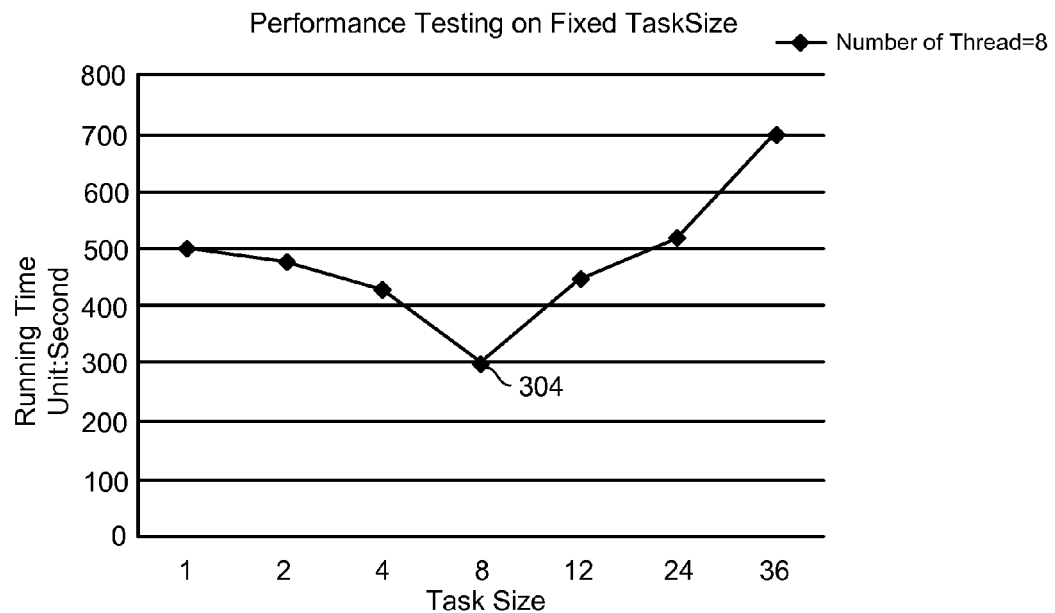
FIG. 3B is a graph illustrating changes in processing speeds as a function of task size.
Figure 4A:
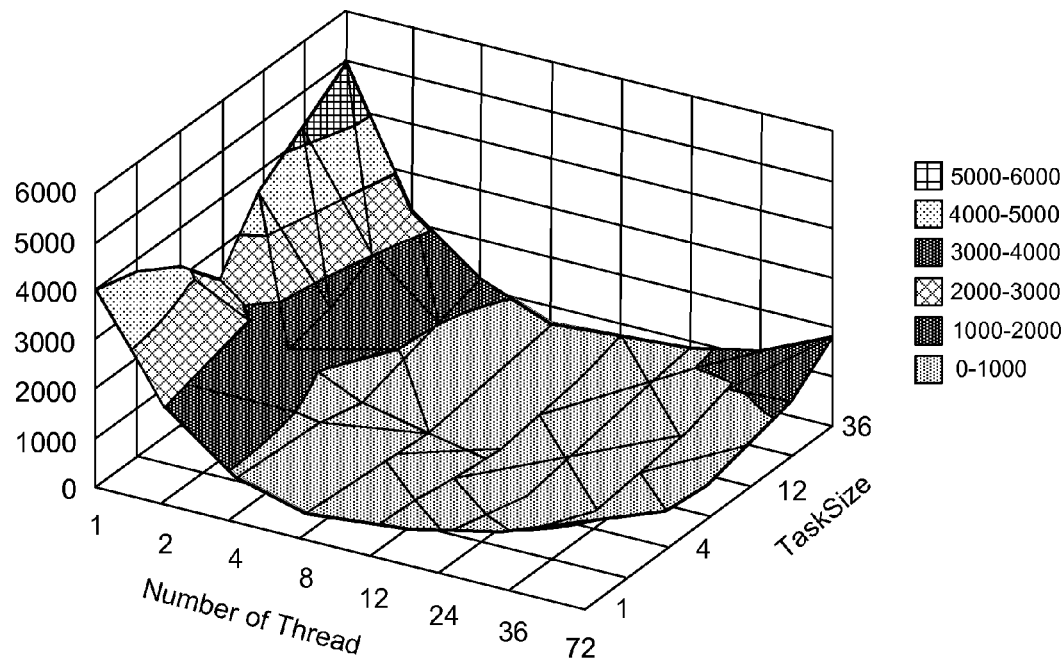
FIG. 4A is a front view of a 3D graph illustrating changes in processing speeds as a function of both thread count and task size.
Figure 4B:
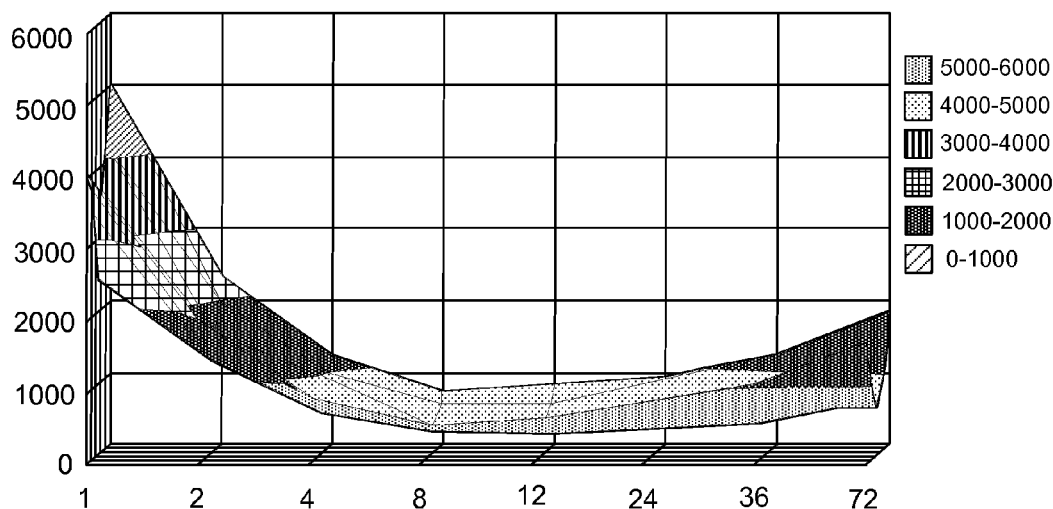
FIG. 4B is a side view of a graph of FIG. 4A.

FIGS. 3A and 3B are graphs illustrating parallel processing performance as a function of thread count and task size, respectively. FIGS. 4A and 4B are three-dimensional graphs illustrating processing performance as a function of both thread count and task size, where, as shown, FIG. 4A is a front view of the illustration of parallel processing performance, and FIG. 4B is a side view of the same illustration.

For example, as referenced above, the graphs of FIGS. 3A-4B may be constructed with respect to execution of tasks related to, e.g., a sale forecasting algorithm for forecasting future sales, which includes a job that may be broken into multiple small tasks with multiple logs of data to be processed in parallel using the platform 106. As described, after execution of these tasks, the results may be consolidated, whereupon a new job may be created, and the process may be repeated in a loop, until a certain condition is met.

In these and other example contexts referenced above, data distribution is not necessarily uniform, so that some of the tasks may run longer than others. As described, this may result in some of the available threads/cores sitting idle until all tasks are completed, which generally results in a reduction of benefits of the parallel processing. As also referenced above, the larger the relative size of the task is, the higher the computational overhead of such unbalanced loads may be.

On the other hand, larger tasks may reduce the computational overhead with respect to the cost of starting new/more threads for each task executed in parallel.

FIGS. 3A and 3B thus illustrates performance measurements of such a sale forecasting algorithm, executed on a workstation using between one and seventy-two processing threads, where a size of each task being processed by one of the threads may range from between 1 to 32 blocks of data. Thus, FIG. 3A illustrates that increasing a number of threads may result in performance increases, until a point of inflection at point 302, after which performance decreases due to the relative amount of computational overhead with respect to the provided benefits of parallelism.

Similarly, with respect to FIG. 3B, FIG. 3B illustrates that increasing a size of a task assigned to each thread causes initial increases in system performance, because the computational overhead of assigning tasks to threads decreases relative to the computational overhead of the presence of an unbalanced load during the parallel execution. However, at the point of inflection 304 and thereafter, when the size of the task assigned to each thread continues to increase, the benefit of having fewer task assignments is overtaken by the computational overhead associated with the resulting unbalanced loads.

Meanwhile, as referenced above, FIGS. 4A and 4B illustrate front and side angle views, respectively, of performance measurements illustrated with respect to both thread count and task size. As illustrated in the example of FIGS. 4A and 4B, the resulting space, which effectively forms a search space for the parallel execution manager 102, may be visualized as a bowl shape, since the processing times decrease around at least one local minimum.

FIGS. 3A-4B thus illustrate that thread count and task size are selectable variables which have a significant impact on a overall efficiency of parallel processing. Moreover, optimal thread counts and task sizes for the most efficient parallelism may vary significantly in different context. For example, parallel processing parameters may be different for different datasets and/or for different types of platforms on which the parallel processing is executed.

Thus, the system 100 of FIG. 1 provides a feedback-driven tuning of parallel processing parameters, without requiring particular knowledge with respect to platform 106 and/or the tasks 104. More specifically, as described, the system 100 of FIG. 1 may be configured to provide tuning of thread count and task size, based on feedback received from the parallel execution of sample or benchmark tasks, to thereby explore the solution space illustrated in the example of FIGS. 4A, 4B, in an attempt to find the local minimum thereof.

In more specific examples, as described in more detail below, the task size may be incrementally increased as long as the response time continues to be improved. In order to approach the optimal/minimal point, the task size may be changed incrementally in a manner which results in a binary search of the solution space of FIGS. 4A, 4B. As described, the optimal thread count may be approached in a similar manner. As described herein, because the parallelism efficiency is affected by both thread count and task size, the solution space of FIGS. 4A, 4B may be considered by exploring the optimal task size and thread count in an interleaving manner.

Over time, as described above with respect to the verifier 116, changes that may occur with respect to the platform 106 and/or the task 104 may cause the previously-selected values for thread count and task size to become suboptimal. In order to test whether this has occurred, the verifier 116 may dynamically adjust the thread count and task size by intentionally changing values thereof, and then comparing results from the previous values with results obtained using the new values. Consequently, if results from the new values provide more efficient parallelism, then the optimizer 112 may be configured to calculate a new set of parallel processing parameters. In practice, intervals between such verification processes may vary, since the verification processes themselves involve computational overheads which decrease the overall parallelism efficiency. Thus, the verifier 116 may be configured to select intervals between verifications in a manner designed to minimize such computational overhead, while also minimizing a quantity of time during which the platform 106 executes with suboptimal efficiency.

Figure 5:
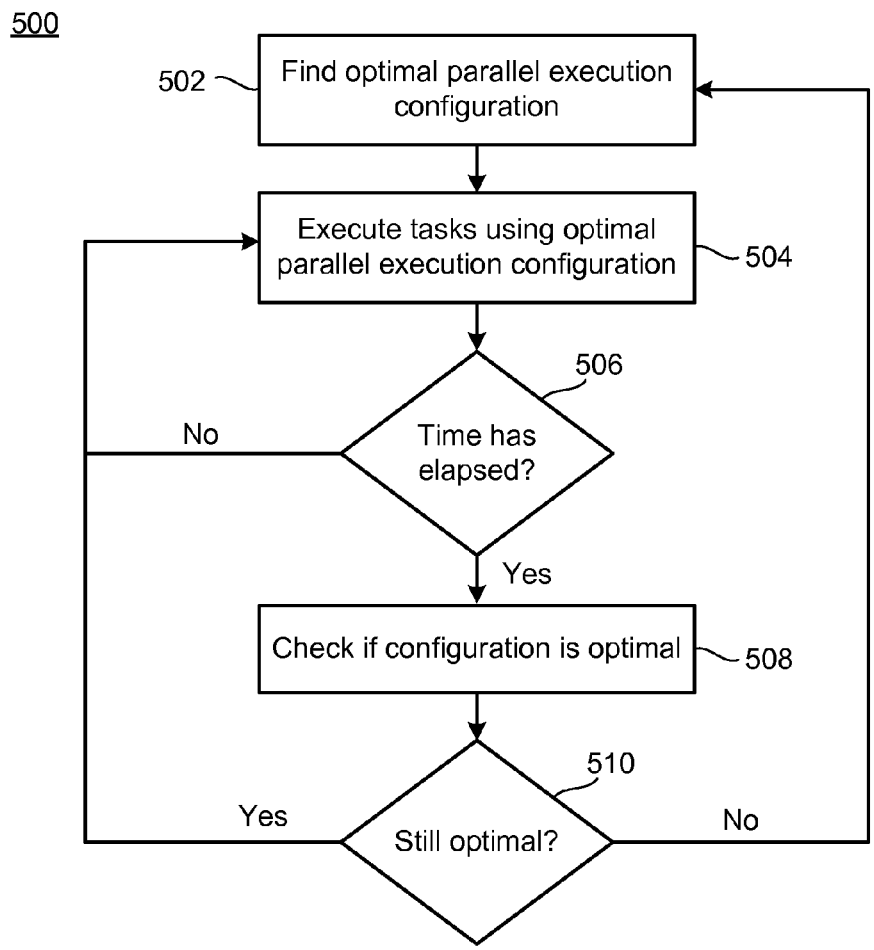
FIG. 5 is a flowchart illustrating more detailed example operations of the system of FIG. 1.

FIGS. 5-9, and corresponding code portions 1-5, provide more detailed examples of the above-described operations of the system 100 of FIG. 1, or variations thereof. Specifically, for example, FIG. 5 is a flowchart 500 illustrating example operations governing an overall process for finding and maintaining optimal parallel processing parameters.

In the example of FIG. 5, an optimal parallel execution configuration and associated parallel processing parameters may be found (502). For example, the parallel execution parallel processing parameters, where, as also described, it may be appreciated that a value or duration of this time interval may itself be dynamically adjusted.

In the example, once a current duration of the relevant time period has elapsed (506), the verifier 116 may proceed to check whether the current configuration remains optimal (508). Specific example operations of the verifier 116 in this regard are provided in more detail below, e.g., with respect to FIG. 9.

Then, if the current configuration remains optimal (510), as determined by the verifier 116, execution of the task 104 using the current parallel execution configuration in conjunction with the platform 106 may proceed (504). On the other hand, if the verifier 116 determines that the current values of the parallel processing parameters are not optimal (510), then the verifier 116 may cause the optimizer 112 to re-execute necessary operations for finding a new, updated optimal parallel execution configuration (502).

Code portion 1 provides example pseudo code in use in implementing the operations of the flowchart 500.

---

Code Portion 1

```
# Entry Point to find an optimal parallel execution with proper numbers of thread and task
    Size, also check the optimal state by the heart beat
        Procedure Run_Parallel_Execution (CountOfProbeForThread,
                                          CountOfProbeForTaskSize,
                                          CountOfProbeForTestOptimal,
                                          TimeSpanForHeartBeatCheck)
    Begin
        //Try to find an optimal parallel execution
        Find_Optimal_Parallel_Execution(CountOfProbeForThread,
                                        CountOfProbeForTaskSize,
                                        CountOfProbeForTestOptimal)
        Run task on the optimal parallel execution in specified Time Span
            IsOptimalState = Check_if_it_is_still_Optimal(NumOfThread,
                                                          TaskSize,
                                                          CountOfProbeForTestOptimal)
        If IsOptimalState = true
            Sleep N seconds and re-check it again. //N: From 1 to N^2, where N^2 < TimeSpanForHeartBeatCheck
        Else
            //Re-find the optimal parallel execution and run it again the lasted number of threads and task size
            Run_Parallel_Execution (CountOfProbeForThread,
                                    CountOfProbeForTaskSize,
                                    CountOfProbeForTestOptimal,
                                    TimeSpanForHeartBeatCheck)
    End
```

--- manager 102 may find optimal values for the thread count and task size, as described herein. In this regard, more specific examples of operations of the optimizer 112 are described below with respect to FIG. 6, and associated operations of the thread count manager 108 and the task size manager 110 are illustrated and described below with respect to FIGS. 7 and 8, respectively.

Then, after an initial determination of the parallel execution configuration, tasks may be executed using the optimal parallel execution configuration as determined (504). That is, upon completion of an initial operation of the parallel execution manager 102 in determining the current values for the optimal thread count and task size, these resulting values may be utilized in causing the platform 106 to execute the tasks 104.

As long as a relevant, determined time period has not elapsed (506), the platform 106 may continue such execution, using the current values for thread count and task size. For example, as described, the verifier 116 may be configured to determine an interval of time after an initial determination of As shown, code portion 1 executes a primary procedure named "run_parallel_execution," which accepts as input the four parameters "count of probe for thread," "count of probe for task size," "count of probe for test optimal," and "time span for heartbeat check." As may be appreciated from the below description, including code portions 2-5, the parameters "count of probe for thread," "count of probe for task size," and "count of probe for test optimal" all refer to a designated maximum number of iterations to be executed before accepting values of, respectively, thread count, task size and iterations therebetween, as having converged to optimal values thereof. Meanwhile, the parameter "time span for heartbeat check" refers to a parameter associated with defining an amount of time between verification operations of the verifier 116, as described herein.

As shown in code portion 1, within the procedure run_parallel_execution, a sub-procedure "find_optimal_parallel_execution" is executed, which is described in detail below, e.g., with respect to FIG. 6 and code portion 2. Generally speaking, as may be understood from the above, this sub-procedure is designed to interleave operations of the managers 108, 110, until an optimal parallel execution configuration is reached.

Subsequently, as shown in code portion 1 and described above with respect to FIG. 5, the task 104 may be executed using the optimal parallel execution configuration for a specified time span. Thereafter, a sub-procedure "check_if_it_is_still_optimal" is executed, which is described below in more detail with respect to FIG. 9 and code portion 5. In general, again, it may be appreciated that the sub-procedure generally represents example operations of the verifier 116, as described herein. If the sub-procedure determines that the optimal parallel execution configuration remains optimal (e.g., "is optimal state=true"), then the verifier 116 may sleep for N seconds, as shown in code portion 1. Otherwise, the verifier 116 may instruct the optimizer 112 to re-execute the primary procedure run_parallel_execution.

Figure 6:
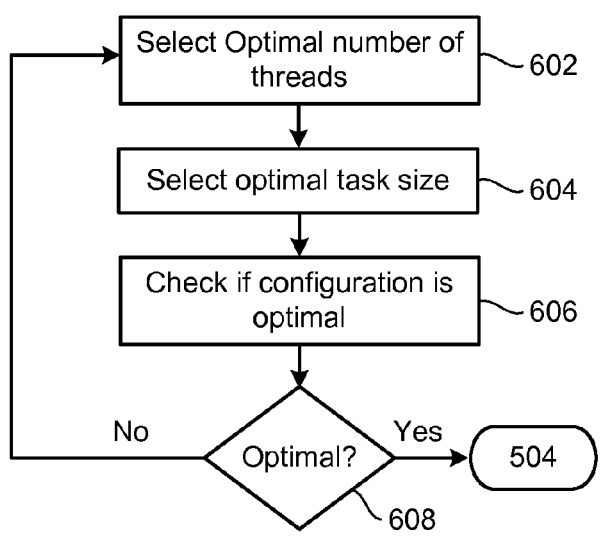
FIG. 6 is a flowchart illustrating example operations for determining optimal parallel execution parameters for use in the flowchart of FIG. 5.

FIG. 6 is a flowchart 600 illustrating example operations for determining an optimal parallel execution configuration, e.g., as described above with respect to operation 502 of FIG. 5. Specifically, as shown, the flowchart 600 may begin with a selection of an optimal number of threads (602), followed by a selection of optimal task size (604). For example, the optimizer 112 may direct the thread count manager 108 to select such an optimal number of threads, using a fixed task size. Operations of the thread count manager 108 in this regard as described above, and more detailed examples are provided below, e.g., with respect to FIG. 7 and code portion 3.

Thereafter, similarly, the optimizer 112 may instruct the task size manager 110 to select the optimal task size, using the just-selected optimal number of threads as fixed thread count value. Operations of the task size manager 110 in this regard are also described above, and more detailed examples of these operations are also provided below, e.g., with respect to FIG. 8 and code portion 4.

If the resulting parallel execution configuration is optimal, as determined by the optimizer 112 (606, 608), then the procedure may advance to operation 504 of FIG. 5. Otherwise, iterations may continue with further selection of an updated optimal number of threads (602), this time utilizing the most recently determined task size as the fixed task size. As described herein, one technique for determining whether the configuration is optimal (608) is to designate a maximum number of iterations of the flowchart 600, so that the determination of the optimal state amounts to a determination of whether the designated maximum number of iterations has been reached.

Code portion 2 illustrates example pseudo code for executing the operations 602-608 of FIG. 6.

Code Portion 2

```
# Find an optimal parallel execution with proper numbers of thread and task size.
Procedure Find_Optimal_Parallel_Execution (CountOfProbeForThread,
                                            CountOfProbeForTaskSize,
                                            CountOfProbeForTestOptimal)
Begin
    # Quadratic probing to determine whether NumOfThread is still the optimized value
    IsOptimalState = false
    While (! IsOptimalState and )
    {
        //Try to find the optimal number of threads
        OptNumOfThread = Select_Optimal_Number_of_threads(lower_bound,
                                                           upper_bound,
                                                           CountOfSearch,
                                                           CountOfProbeForThread)
        //Try to find the proper task size based on the optimal number of threads. With these two constrains, we can get the
            Optimal parallel execution on multi-core server
            OptimalTaskSize=Optimal_Size_Of_Task(OptNumOfThread, CountOfProbeForTaskSize)
        //Check whether the system is running under the optimal state
        IsOptimalState = Check_if_it_is_still_Optimal (OptNumOfThread, OptimalTaskSize, Threshold)
    }
End
```

As shown in code portion 2, a primary procedure "find_optimal_parallel_execution" may initially determine whether a current optimal thread count (i.e., "NumOfThread") continues to represent an optimized thread count value, using quadratic probing, as described in more detail below with respect to FIG. 7. If the parallel execution configuration is not optimal, then sub-procedures "select_optimal_number_of_threads" (described in detail below with respect to FIG. 7 and code portion 3) and sub-procedure "select_optimal_size_of_task" (described in detail below with respect to FIG. 8 and code portion 4) may be iteratively executed until the system is determined to be executing in an optimal state.

Of course, additional or alternative techniques may be utilized to determine whether the platform 106 is executing in an optimal state. For example, the optimizer 112 may execute procedures which are partially or completely similar to, or the same as, procedures implemented by the verifier 116, as described in detail below with respect to FIG. 9 and code portion 5. Specifically, for example, as described in detail herein, the optimizer 112 (e.g., the verifier 116) may utilize binary or quadratic search techniques to explore the search space of the parallel processing parameters (as illustrated in the example of FIGS. 4A, 4B), in the neighborhood of the currently-considered parallel execution configuration, so as to determine a likelihood that the current parallel execution configuration represents a local minimum of the solution search space. If not, as evidenced by, e.g., relatively better solution computerizations detected during the quadratic probing, then operations may continue with operation 602, as described herein.

Figure 7:
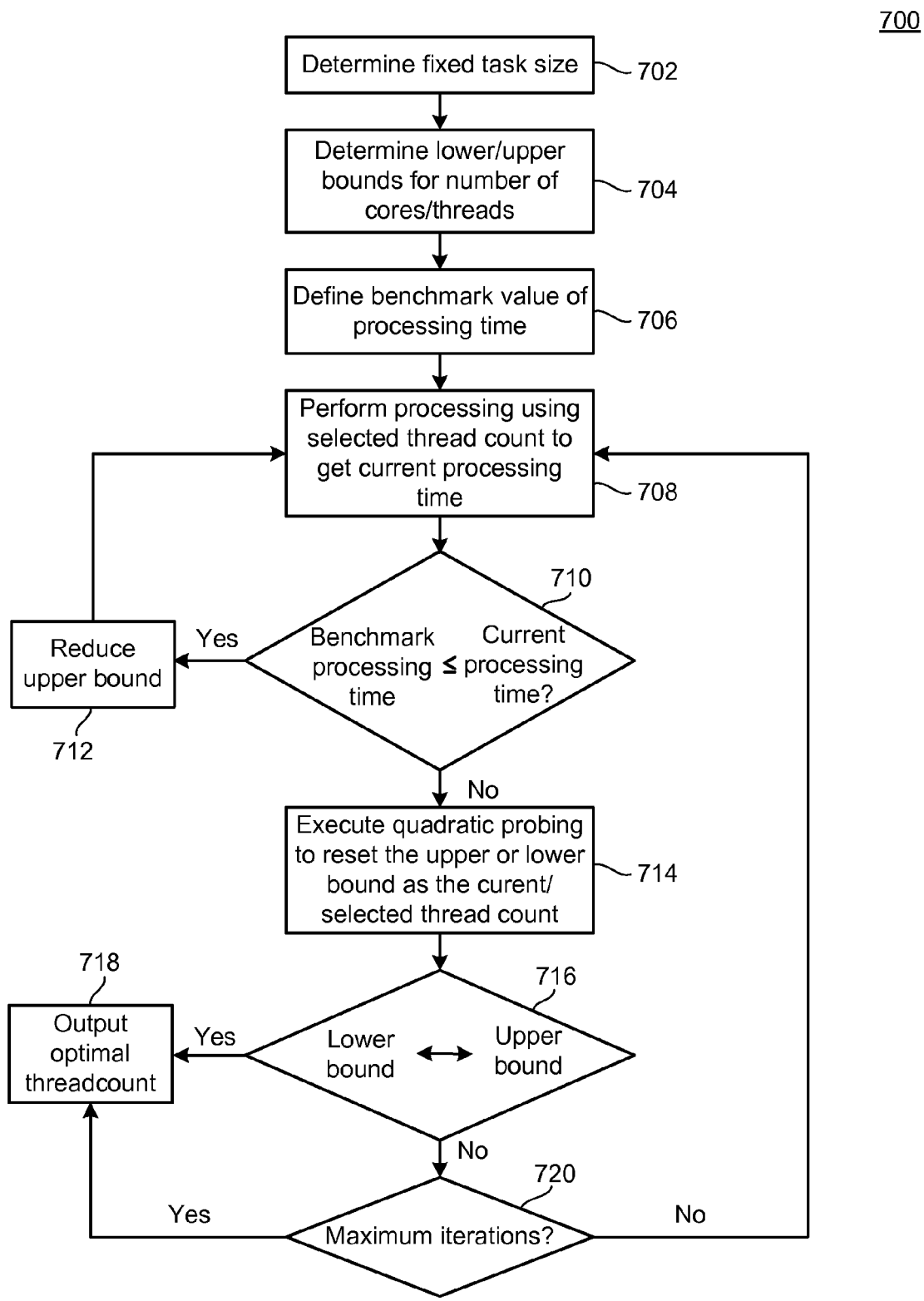
FIG. 7 is a flowchart illustrating example operations for selecting an optimal thread count for fixed task size.

As referenced above, FIG. 7 is a flowchart 700 illustrating example operations of the thread count manager 108 in determining an optimal thread count. In the example of FIG. 7, the thread count manager 108 may initially determine a fixed task size to utilize (702). For example, in an initial iteration, the fixed task size may be received from an operator of the parallel execution manager 102. In later iterations, the fixed task size may be received from an output of the task size manager 110.

Upper and lower bounds for a potential number of threads, e.g., processing cores, may then be determined (704). For example, again, a maximum number of available cores may be received from an operator of the parallel execution manager 102. Similarly, a minimum number of cores also may be received from the operator. Additionally, or alternatively, certain parallel processing computations may be pre-designated as requiring some minimum number of parallel threads, and/or an upper bound of maximum cores that may be used may be defined or otherwise determined as a multiple of the lower bound.

A benchmark value for parallel processing time may be computed or otherwise defined (706). For example, pre-defined tasks or types of tasks may be computed in parallel using the platform 106, to serve as a basis for comparison for later computations. In the example, the lower bound of the number of threads may be utilized to compute the benchmark value.

Thereafter, parallel processing using a selected thread count may be performed, to thereby obtain a current parallel processing time (708). For example, a random number between one more than the lower bound and the upper bound may be selected at random and utilized by the platform 106 to execute the same task or types of tasks previously executed to obtain the benchmark value processing time. In this way, a current processing time may be obtained for comparison thereof to the benchmark processing time.

If the benchmark processing time is less than or equal to the current processing time (710), then the upper bound may be reduced (712), and a new selected thread count between the lower bound +1 and the new, reduced upper bound may be selected to get an updated, current processing time (708).

Otherwise, (710), the thread count manager 108 may execute quadratic probing with respect to the current, selected thread count (714). More specifically, the thread count manager may execute quadratic probing by performing processing of the sample tasks using one less thread and one more thread than the current, selected thread count, in order to determine a direction of improvement of processing time in the context of the graphs of FIGS. 4A, 4B. In this way, the thread count manager 108 may reset the current, selected thread count as either the new lower bound or the new upper bound, depending on a direction of improvement determined by the quadratic probing.

If, as a result of this setting of the upper or lower bound, the upper and lower bound converge (716), then the converged thread count may be provided as the optimal thread count (718). Otherwise, if a predefined maximum number of iterations has been reached (720), then again the current thread count may be provided as the optimal thread count (718). Otherwise, processing may continue using a new, selected thread count, e.g, which may be selected at random from between the current range of lower/upper bounds.

Code portion 3 is an example pseudo code illustrating a potential implementation of the flowchart 700 of FIG. 7.

Code Portion 3

```
Procedure Select_Optimal_Number_of_threads(Lower_bound,
                                           Upper_bound,
                                           CountOfSearch
                                           CountOfProbeForThread)
    Begin
#Identify the range to get the global optimized number of thread in the condition of fixed task size.
        #Find out the upper bound and lower bound for the selected range
        if lower_bound = 0
            lower_bound = GetNumberOfCores( )
        if upper_bound = 0
#N: Pre-defined parameter to estimate the upper bound, the value of N may be changed if the global optimized number
of threads does not exist in the [lower_bound, upper_bound]
            upper_bound = N * lower_bound
        #Find out the pivot value of the performance comparison
        TimeSpanPivot = Do_Processing_Based_On_Threads(lower_bound)
        NumOfThread = GetRandomBetween(lower_bound+1,upper_bound)
        TimeSpanToCompare = Do_Processing_Based_On_Threads (NumOfThread)
        if TimeSpanPivot <= TimeSpanToCompare
            Upper_bound =(lower_bound +NumOfThread)/2
        else
           #need quadratic probing to determine the NumOfThread is left or right to the optimized value
            TimeSpanNeighbourLeft = Do_Processing_Based_On_Threads (NumOfThread - 1)
            TimeSpanNeighbourRight = Do_Processing_Based_On_Threads (NumOfThread + 1)
            if TimeSpanNeighbourLeft > TimeSpanNeighbourRight
                Lower_bound = NumOfThread
            else
                Upper_bound = NumOfThread
            endif
        endif
        CountOfSearch += 1
        If lower_bound == upper_bound
            return NumOfThread
        If CountOfSearch < CountOfProbeForThread
            #Invoke the Select_Optimal_Number_of_threads( ) recursively until find the
            Select_Optimal_Number_of_threads(lower_bound, upper_bound,CountOfSearch,threshold)
        else
            return NumOfThread
    End
```

In code portion 3, "select_optimal_number_of_threads" is received as input values for a lower bound and upper bound of possible thread counts, as well as a value for "count of probe for thread," which refers to a value for a maximum number of iterations to be performed. Meanwhile, the variable "count of search" refers to a local variable used to increment a current number of iterations. In code portion 3, therefore, as referenced above, the lower bound and upper bound may be defined as such, where, as shown, the upper bound may be defined as a multiple of lower bound.

In code portion 3, the benchmark value of processing time is defined as the variable "time span pivot," and is obtained based on processing using the lower bound of the thread count. Then, as shown, a current, selected number of threads "NumOfThread" may be selected at random between the lower bound +1 and the upper bound. Then, a current processing time defined as "time span to compare" may be obtained by performing parallel processing using this selected number of threads.

Code portion 3 thereafter illustrates the above-described comparison of the "time span pivot" to the "time span to compare," and the possible results of the comparison of either resetting the upper bound between the lower bound and the current number of threads, or the subsequent execution of quadratic probing using one more or one less than the current thread count. In the latter case, as shown, if a time span associated with performing processing based on one fewer number of threads is larger than a time span obtained from performing probe processing using one greater then the current number of threads, then the current number of threads may be set as the new lower bound. Such a result indicates that improvements (i.e., decreases) in parallel processing time may be obtained with a larger number of threads. Conversely, otherwise, the current number of threads may be set as the new upper bound, since such a result may indicate that the optimal number of threads is below the current, selected number of threads.

The remaining portions of code portion 3 illustrate, as referenced above, that convergence of the lower and upper bounds result in a return of the current number of threads as the optimal number of threads. Otherwise, code portion 3 continues until the threshold defined by count of probe for thread is reached, at which point a current thread count is provided as the optimal thread count.

Figure 8:
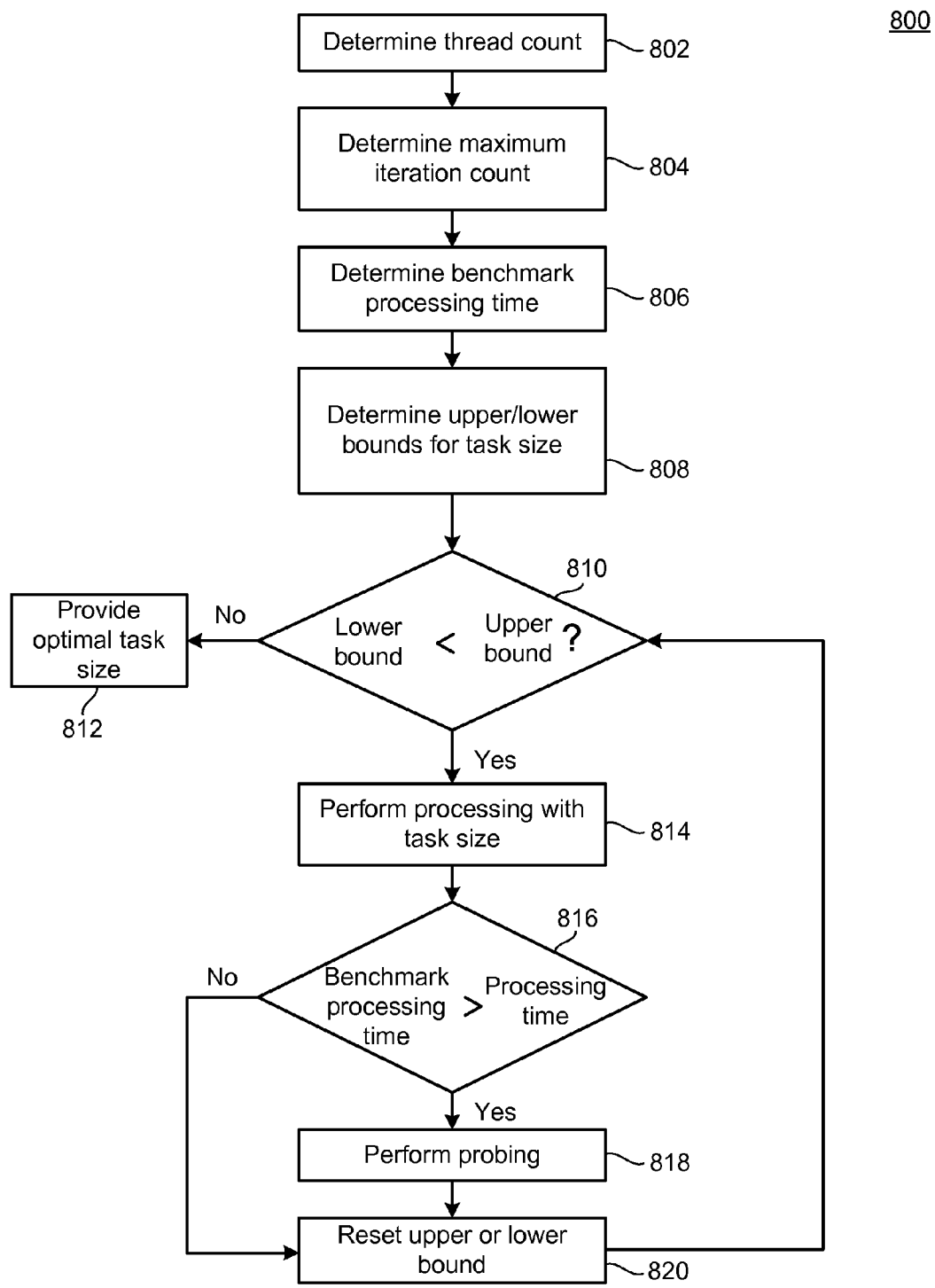
FIG. 8 is a flowchart illustrating example operations for selecting an optimal task size for a fixed thread count.

FIG. 8 is a flowchart 800 illustrating more detailed example operations of the task size manager 110. As may be appreciated from the above description, operations of the task size manager 110 in this regard are conceptually similar to the example operations of the thread count manager 108 just described above with respect to FIG. 7. That is, generally speaking, the task size manager 110 may be configured, for a fixed thread count, to iteratively test a search space of potential task sizes that might possibly serve as the optimal task size.

Thus, in the example of FIG. 8, the task size manager 110 may initially determine a fixed thread count (802). As may be appreciated, the thread count may initially be received from an operator of the parallel execution manager 102, or, in operations of the task size manager 110 which follow operations of the thread count manager 108, the thread count may be received from the output of the thread count manager 108.

The task size manager 110 may further determine a maximum iteration count (804), reflecting a maximum number of iterations of operations of the task size manager 110 in attempting to determine the optimal task size. As illustrated and described below with respect to code portion 4, a maximum number of iterations may be determined based on a total data size of the one or more tasks in question, relative to the fixed thread count.

The task size manager 110 may proceed to determine a benchmark processing time (806), where an additional value of the benchmark processing time may be determined using a starting value of 1, (e.g., a 1 bit block). Thereafter, upper/lower bound for the task size may be determined (808). For example, the upper/lower bounds may be determined by binding the largest and smallest task sizes which may be equally assigned to each thread of the fixed thread count.

As long as the upper bound remains greater than the lower bound (810), then processing may proceed (814), using the task size of the current iteration. The task size of an initial iteration may be determined as a function of one or both of the upper/lower bounds.

Then, if the resulting of processing time is smaller than the current benchmark processing time (816), then the upper bound may be reset (820). If the lower bound, as a result, is no longer less than the upper bound (810), then the current task size may be provided as the optimal task size (812).

On the other hand, if the lower bound remains less than the upper bound (810), then processing may continue. Specifically, a subsequent task size may be selected to obtain an updated processing time (814), and the resulting processing time may be compared with the current benchmark processing time (i.e., the processing time determined using the previous task size of the previous iteration). If the current processing time is less than the current benchmark processing time, then the task size manager 110 may proceed with quadratic probing to determine a direction (i.e., larger or smaller) of the next task size to consider in the next iteration. Then, the upper or lower bound may be reset accordingly (820), to determine whether the lower and upper bounds have converged (810).

Code portion 4 is example pseudo code illustrating a possible implementation of the operations of the flowchart 800 of FIG. 8.

---

Code Portion 4

```
ProcedureSelect_Optimal_Size_of_Task(NumOfThread, CountOfProbeForTaskSize)
    Begin
    #for the fixed task size, NumOfThread is the global optimized value. Now based on this, try to find the optimal task size
    #to get the best performance for problem solving.
    #Find out the minimum and maximum iteration for each thread, each task size should be times of 2^n
    max_iteration = DataSize / NumOfThread
    TimeSpanPivot =max_iteration * Do_Processing_Based_On_TaskSize(tasksize = 1)
    OptimalTaskSize = 1
    #Find out the upper bound and lower bound for the task size which can be assigned to each thread equally.
    lower_bound = 1
    upper_bound =floor( )
    while(lower_bound < upper_bound)
        TimeSpanToCompare = Do_Processing_Based_On_TaskSize(tasksize = 2^upper_bound)
            if TimeSpanPivot > TimeSpanToCompare
                #need once probing to determine the tasksize is left or right to the optimized value
                TimeSpanToCompare = Do_Processing_On_TaskSize(tasksize = 2^(upper_bound-1)
```

Code Portion 4

```
            if TimeSpanPrevious > TimeSpanToCompare
                return 2^upper_bound
            else
                upper_bound = (lower_bound + upper_bound) / 2
        else
            lower_bound = (lower_bound + upper_bound) / 2
return OptimalTaskSize = 2^n
End
```

As shown, the code portion 4 implements a procedure "select_optimal_size_of_task," which, as shown, code portion 4 determines a maximum iteration value max iteration as a function of the total data size and the fixed thread count. Then, the upper and lower bounds may be determined based on which task sizes may be equally assigned to each thread of the fixed thread count. Thereafter, as referenced above with respect to FIG. 8, the upper/lower bounds may be iteratively reset in association with comparisons of current parallel processing times with previously-determined benchmark processing times, including the use of quadratic probing to determine a subsequent task size to utilize in a subsequent iteration. In this way, the upper and lower bounds may converge to determine the optimal task size for the original fixed thread count.

Figure 9:
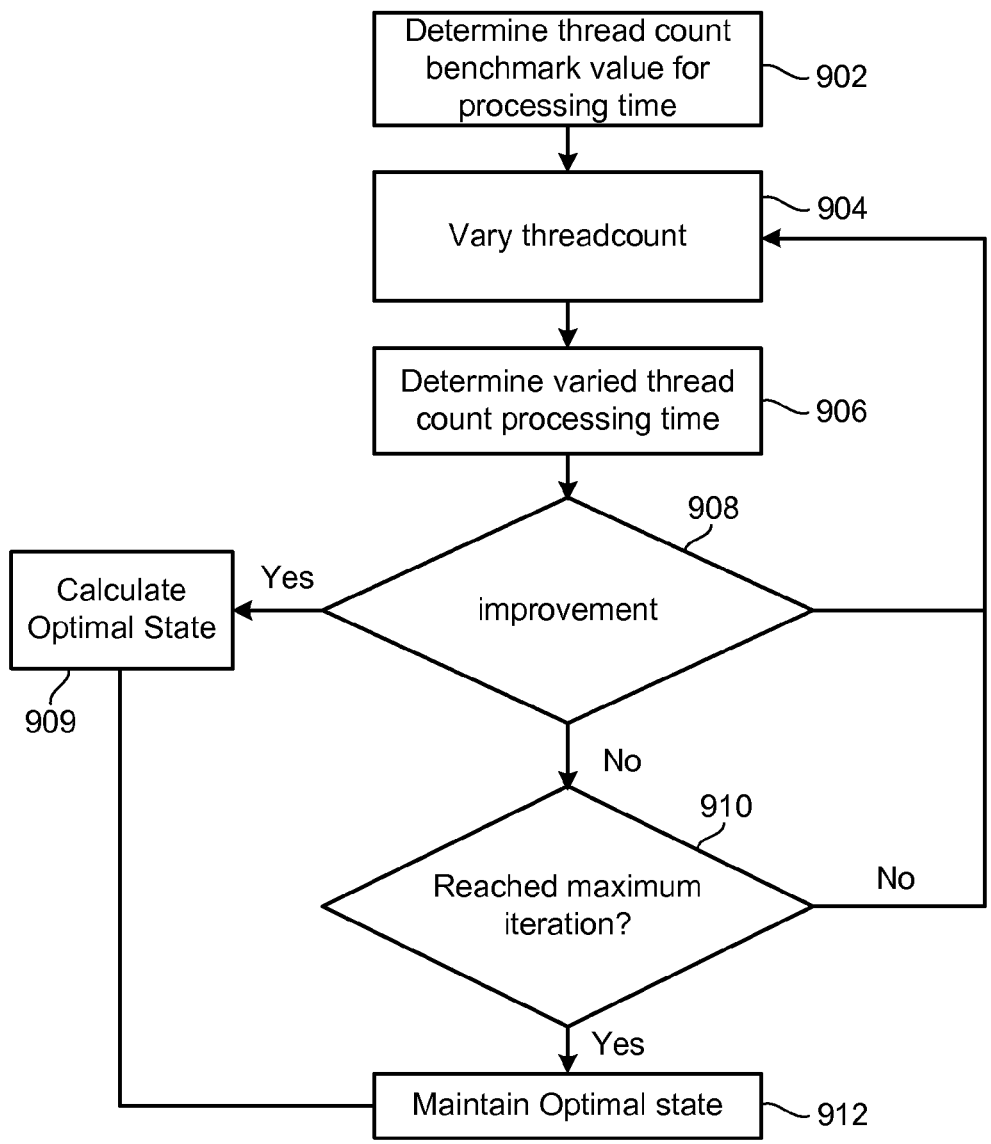
FIG. 9 is a flowchart illustrating example operations for verifying a continuing applicability of the optimal parallel execution parameters in FIG. 5.

FIG. 9 is a flowchart 900 illustrating example operations of the verifier 116 in verifying whether a current parallel execution configuration (including associated values for an optimal thread count and task size) remains optimal. In the example of FIG. 9, operations are illustrated and described with respect to the thread count manager 108. However, it may be appreciated from the above, and from the example of code portion 5, below, that substantially similar operations may be executed with respect to the task size.

In the example of FIG. 9, the verifier 116 may begin by select determining a thread count benchmark value for a parallel processing time (902). In this context, the benchmark processing time is equivalent to the processing time determined using the current, previously-determined optimal thread count.

Thereafter, the verifier 116 may vary this thread count (904). For example, the verifier 116 may either raise or lower the thread count. A thread count processing time for the varied thread count may be determined (906). If the varied thread count processing time represents an improvement over the benchmark processing time (908), then the verifier 116 may signal the optimizer 112 to recalculate the values for the optimal parallel execution configuration (909), i.e., may instruct the optimizer 112 to execute the operations of the flowchart 600 of FIG. 6.

Otherwise, if the verifier 116 has not varied the thread count in both directions (910), then the verifier 116 may proceed to vary the thread count accordingly (904). Then, after the verifier 116 has checked processing times above and below the processing time associated with the current thread count (910), and in the case where no improvement has been observed, then the current parallel execution configuration may be maintained as the optimal state (912) until subsequent execution of the verifier 116.

Code portion 5 illustrates a detailed example of pseudo code that may be utilized to implement operations of the flowchart 900 of FIG. 9.

```
Procedure Check_if_it_is_still_Optimal (NumOfThread, TaskSize, CountOfProbeForTestOptimal)
    Begin
        IsOptimalState = false;
        # Quadratic probing to determine whether NumOfThread is still the optimized value
        TimeSpanPivot = Do_Processing_Based_On_Threads(NumOfThread)
        for var from 1 to CountOfProbeForTestIOptimal
            NumOfThread += (−1)^var * var^2
            TimeSpanToCompare = Do_Processing_Based_On_Threads (NumOfThread )
            if TimeSpanToCompare < TimeSpanPivot
                IsOptimalState = false
            else
                continue
            IsOptimalState = true
        # Quadratic probing to determine whether TaskSize is still the optimized value
        TimeSpanPivot = Do_Processing_Based_On_TaskSize (TaskSize)
        for var from 1 to CountOfProbeForTestIOptimal
            TaskSie += (−1)^var * var^2
            TimeSpanToCompare = Do_Processing_Based_On_TaskSize (TaskSize)
            if TimeSpanToCompare < TimeSpanPivot
                IsOptimalState = false
            else
                continue
        return IsOptimalState
    End
```

In the example of code portion 5, a procedure "check_if_it_is_still_optimal" begins with a verification of the current thread count as the optimal thread count. As described with respect to FIG. 9, code portion 5 executed quadratic probing by calculating, processing times associated with thread count values above and below a current thread count value. As also described, if such quadratic probing determines that an improvement in parallel processing time is observed, then the verifier 116 may determine that the current thread count value is no longer the optimal thread count value, and may accordingly indicate that the current parallel processing configuration is no longer optimal (i.e., "is optimal state=false"). As shown, in code portion 5, and as referenced above, a similar sub-procedure may be performed, if necessary, to determine whether the current task size continues to represent an optimal task size or not.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    at least one processor; and
    a non-transitory computer-readable storage medium configured to store software code executable by the at least one processor, wherein the software code includes
    a parallel execution manager configured to cause the at least one processor to determine a parallel execution platform configured to execute tasks in parallel using a plurality of available processing threads, the parallel execution manager including
        a thread count manager configured to select, from the plurality of available processing threads and for a fixed task size, a selected thread count;
        a task size manager configured to select, from a plurality of available task sizes and using the selected thread count, a selected task size; and
        an optimizer configured to execute an iterative loop in which the selected task size is used as an updated fixed task size to obtain an updated selected thread count, and the updated selected thread count is used to obtain an updated selected task size, and further configured to complete the iterative loop and provide a current thread count and current task size for use by the parallel execution platform in executing the tasks in parallel.

2. The system of claim 1, wherein the parallel execution manager comprises a response time monitor configured to monitor an execution time of the tasks by the parallel execution platform.

3. The system of claim 1, wherein the thread count manager is configured to receive a benchmark processing time for the task from the response time monitor while using an existing thread count, and further configured to iteratively test subsequent thread counts against the benchmark processing time, including replacing the existing thread count with a subsequent thread count whenever the subsequent thread count is associated with a parallel processing time that is superior to the benchmark processing time, until the selected thread count is obtained.

4. The system of claim 3, wherein the thread count manager is configured to perform quadratic probing of a solution space of the subsequent thread counts to select therefrom for the iterative testing against the benchmark processing time.

5. The system of claim 1, wherein the task size manager is configured to receive a benchmark processing time for the task from the response time monitor while using an existing task size, and further configured to iteratively test subsequent task sizes against the benchmark processing time, including replacing the existing task size with a subsequent task size whenever the subsequent task size is associated with a parallel processing time that is superior to the benchmark processing time, until the selected task size is obtained.

6. The system of claim 5, wherein the task size manager is configured to perform probing of a solution space of the subsequent task sizes, wherein the solution space includes tasks sizes which may be assigned to each processing thread equally.

7. The system of claim 1, wherein the parallel execution manager comprises a verifier configured to verify, after a period of time following the providing thereof, a continuing optimal status of the current thread count and the current task size.

8. The system of claim 7, wherein the verifier is configured to:
  determine a benchmark processing time with respect to a benchmark task, using the current thread count and/or the current task size;
  vary the current thread count and/or the current task size and obtain an updated benchmark processing time therewith; and
  indicate that the current thread count and/or current task size are no longer optimal, based on a comparison of the benchmark processing time with the updated benchmark processing time.

9. The system of claim 7, wherein the verifier is configured to dynamically adjust the period of time in between each of a plurality of verifications of the current thread count and/or task size.

10. A computer-implemented method for executing instructions stored on a computer readable storage medium, the method comprising:
  determining a parallel execution platform configured to execute tasks in parallel using a plurality of available processing threads;
  selecting, from the plurality of available processing threads and for a fixed task size, a selected thread count;
  selecting, from a plurality of available task sizes and using the selected thread count, a selected task size;
  executing an iterative loop in which the selected task size is used as an updated fixed task size to obtain an updated selected thread count, and the updated selected thread count is used to obtain an updated selected task size; and
  completing the iterative loop and provide a current thread count and current task size for use by the parallel execution platform in executing the tasks in parallel.

11. The method of claim 10, comprising:
  monitoring an execution time of the tasks by the parallel execution platform; and
  selecting the selected thread count and the selected task size based on the monitored execution time.

12. The method of claim 10, wherein selecting, from the plurality of available processing threads and for a fixed task size, a selected thread count, comprises:
  receiving a benchmark processing time for the tasks while using an existing thread count; and
  iteratively testing subsequent thread counts against the benchmark processing time, including replacing the existing thread count with a subsequent thread count whenever the subsequent thread count is associated with a parallel processing time that is superior to the benchmark processing time, until the selected thread count is obtained.

13. The method of claim 10, wherein selecting, from a plurality of available task sizes and using the selected thread count, a selected task size, comprises:
  receiving a benchmark processing time for the tasks using an existing task size; and
  iteratively testing subsequent task sizes against the benchmark processing time, including replacing the existing task size with a subsequent task size whenever the subsequent task size is associated with a parallel processing time that is superior to the benchmark processing time, until the selected task size is obtained.

14. The method of claim 10, comprising verifying, after a period of time following the providing thereof, a continuing optimal status of the current thread count and the current task size, wherein the verifying includes:
  determining a benchmark processing time with respect to a benchmark task, using the current thread count and/or the current task size;
  varying the current thread count and/or the current task size and obtain an updated benchmark processing time therewith; and
  indicating that the current thread count and/or current task size are no longer optimal, based on a comparison of the benchmark processing time with the updated benchmark processing time.

15. A computer program product, the computer program product being tangibly embodied on a non-transitory computer-readable storage medium and comprising instructions that, when executed, are configured to:
  determine a parallel execution platform configured to execute tasks in parallel using a plurality of available processing threads;
  select, from the plurality of available processing threads and for a fixed task size, a selected thread count;
  select, from a plurality of available task sizes and using the selected thread count, a selected task size;
  execute an iterative loop in which the selected task size is used as an updated fixed task size to obtain an updated selected thread count, and the updated selected thread count is used to obtain an updated selected task size; and
  complete the iterative loop and provide a current thread count and current task size for use by the parallel execution platform in executing the tasks in parallel.

16. The computer program product of claim 15, wherein the instructions, when executed, are further configured to:
  monitor an execution time of the tasks by the parallel execution platform; and
  select the selected thread count and the selected task size based on the monitored execution time.

17. The computer program product of claim 16, wherein the selection of the selected thread count includes:
  receiving a benchmark processing time for the tasks while using an existing thread count; and
  iteratively testing subsequent thread counts against the benchmark processing time, including replacing the existing thread count with a subsequent thread count whenever the subsequent thread count is associated with a parallel processing time that is superior to the benchmark processing time, until the selected thread count is obtained.

18. The computer program product of claim 16, wherein the selection of the selected task size includes:
  receiving a benchmark processing time for the tasks while using an existing task size; and
  iteratively testing subsequent task sizes against the benchmark processing time, including replacing the existing task size with a subsequent task size whenever the subsequent task size is associated with a parallel processing time that is superior to the benchmark processing time, until the selected task size is obtained.

19. The computer program product of claim 15, wherein the instructions, when executed, are further configured to:

verify, after a period of time following the providing thereof, a continuing optimal status of the current thread count and the current task size.

20. The computer program product of claim 19, wherein the verifying includes:
- determining a benchmark processing time with respect to a benchmark task, using the current thread count and/or the current task size;
- varying the current thread count and/or the current task size and obtain an updated benchmark processing time therewith; and
- indicating that the current thread count and/or current task size are no longer optimal, based on a comparison of the benchmark processing time with the updated benchmark processing time.

* * * * *